Oct. 12, 1943.                J. R. HALL                2,331,393
                      AUXILIARY AIR ADMISSION VALVE
                      Original Filed April 22, 1939

Inventor
Joseph R. Hall

Patented Oct. 12, 1943

2,331,393

UNITED STATES PATENT OFFICE 2,331,393

AUXILIARY AIR ADMISSION VALVE

Joseph R. Hall, Brooklyn, N. Y.

Substituted for abandoned application Serial No. 269,463, April 22, 1939. This application July 31, 1943, Serial No. 496,918

1 Claim. (Cl. 277—29)

This application is a substitute or duplicate of my abandoned application Serial No. 269,463, filed April 22, 1939 and allowed May 17, 1940.

The invention aims to provide a simple, inexpensive and efficient device for admitting auxiliary air to the intake manifold of an internal combustion engine (primarily an automobile engine) whenever the engine is operating with the throttle valve open to a predetermined extent, and for prohibiting admission of such air whenever said throttle valve is closed beyond said predetermined extent. Thus, a saving in fuel may be effected at ordinary running speed, but admission of air at lower or idling speed prohibited so that it cannot interfere with smooth engine operation.

A further object of the invention is to provide a device of the class described which is entirely automatic, the air-admission valve being held in open position by a spring at running speeds and being drawn to a closed position by the increased suction in the intake manifold when the throttle valve is closed beyond a predetermined extent.

With the foregoing in view, the invention resides in the novel subject matter hereinafter described and claimed, description being accomplished by reference to the accompanying drawing.

Figure 1:
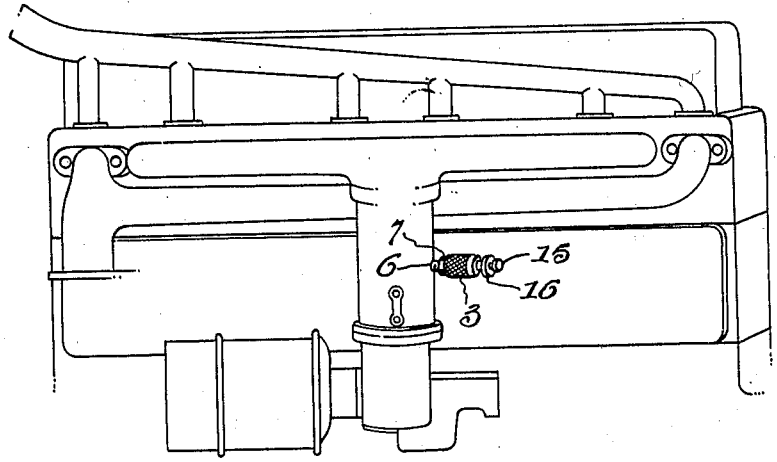
Figure 1 is a perspective view illustrating the application of the invention.
Figure 2:
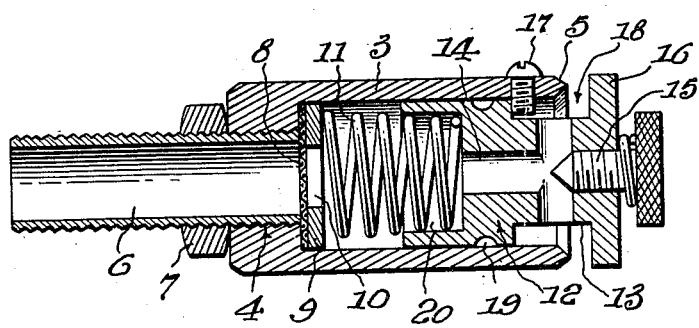
Figure 2 is an enlarged longitudinal sectional view.

A preferred construction has been selected for illustration and will be rather specifically described, with the understanding, however, that minor variations may be made within the scope of the invention as claimed.

A cylinder 3 is provided having a threaded opening 4 in one end, the other end of said cylinder being suitably shaped, for example, as illustrated at 5, to provide a valve seat. A nipple 6 is threaded through the opening 4 and may be adjusted to extend a greater or lesser distance into said cylinder for a purpose to appear, a lock nut 7 being shown for relatively locking the nipple and cylinder after adjustment of the former.

An air screen 8 is shown abutting the inner end of the nipple 6, and I have shown a disk 9 lying against the inner side of said spring, said disk having a single aperture 10 or a plurality of apertures. This disk forms an abutment for the inner end of a coiled compression spring 11 which normally holds the air admission valve 12 in open position, and it will be seen that inward or outward adjustment of the nipple 6 will adjust the strength of said spring to permit proper initial adjustments of the device when installing it upon an engine.

The valve 12 is of the piston type, said valve being slidable in the end portion of the cylinder 3 which is provided with the seat 5. A portion 13 of this valve projects beyond the cylinder, and said valve is provided with a port 14 shown in the form of a T, said port extending from the periphery of said portion 13 through the inner end of the valve 12. A conventional needle valve 15 has been illustrated for controlling the conducting capacity of the port.

The outer end of the valve 12 is provided with an annular lateral flange 16 constituting a valve for coaction with the seat 5 when the piston valve 12 is drawn inwardly by sufficient suction in the intake manifold, thereby prohibiting entrance of air through the port 14, the cylinder 13 and the nipple 6 to the manifold. To limit the outward movement of the valve under the influence of the spring 11, a stop screw 17 has been shown, threaded through the cylinder wall, the inner end of said stop screw being receivable in an annular channel 18 formed in the body of the valve. The periphery of this valve is preferably formed with an annular groove 19 to receive graphite or other lubricant, and the inner end of said valve may well be provided with a recess 20 receiving the outer end of the spring 11.

To install the device, the nipple 6 is tapped into the intake manifold at a point between the usual throttle valve and the intake valves of the engine. Then, by threading the nipple 6 a greater or lesser distance into the cylinder 3, the strength of the spring 11 may be so adjusted as to cause said spring to hold the valve 12 against closing at ordinary running speeds, the vacuum within the intake manifold being then relatively weak due to the fact that the throttle valve is then opened to a relatively great extent. Thus, at running speeds, auxiliary air will be supplied to the engine cylinders to effect a saving in fuel. Whenever the throttle valve is closed beyond a predetermined extent, for instance, to idle the engine, the vacuum within the intake manifold becomes much stronger, with the result that the spring 11 can no longer resist the inward pull exerted by said vacuum upon the valve 12. Consequently, this valve slides inwardly against the action of the spring 11 until the flange 16 seats upon the seat 5, thereby prohibiting entrance of auxiliary air for idling or relatively low speeds and consequently insuring that the device shall not interfere with smooth engine operation at such speeds.

From the foregoing, taken in connection with the accompanying drawing, it will be seen that novel and advantageous provision has been made for carrying out the objects of the invention. While preferred details have been illustrated, attention is again invited to the possibility of making minor variations within the scope of the invention as claimed.

Furthermore, while I have illustrated the valve associated with an engine in which the intake manifold extends upwardly from the carbureter, it will be understood that it is equally applicable to engines having down-draught carbureters.

I claim:

An auxiliary air admission device comprising a cylinder having means at one end for placing it in communication with an intake manifold, the other end of said cylinder being open and provided with an outwardly facing valve seat, a piston slidable in said cylinder and having a recess in its inner extremity, said piston having an outer end portion projecting beyond said open end of said cylinder, said projecting piston portion having a peripheral flange normally spaced outwardly from said valve seat, said piston being provided with a wide peripheral groove having a portion of its width disposed beyond said open end of said cylinder when the flange is spaced from said seat and the remainder of its width within said cylinder, the periphery of said piston being also provided between the inner end of said piston and said wide groove with a shallow lubricant groove, said piston having a T-shaped air admission port extending from diametrically opposite points in the bottom of said wide groove into said recess in the inner extremity of said piston, a screw threaded into the outer extremity of said piston and extending into said T-shaped port to control the amount of air admitted therethrough, a stop screw projecting inwardly from the cylinder wall into said wide groove for limiting the outward movement of said piston, and a spring in said cylinder urging said piston outwardly to the extent allowed by said stop screw, said spring having one end seated in said recess.

JOSEPH R. HALL.